Dec. 6, 1938. J. R. GAMMETER 2,139,545
DIPPED RUBBER ARTICLE AND METHOD FOR MAKING THE SAME
Filed May 11, 1937
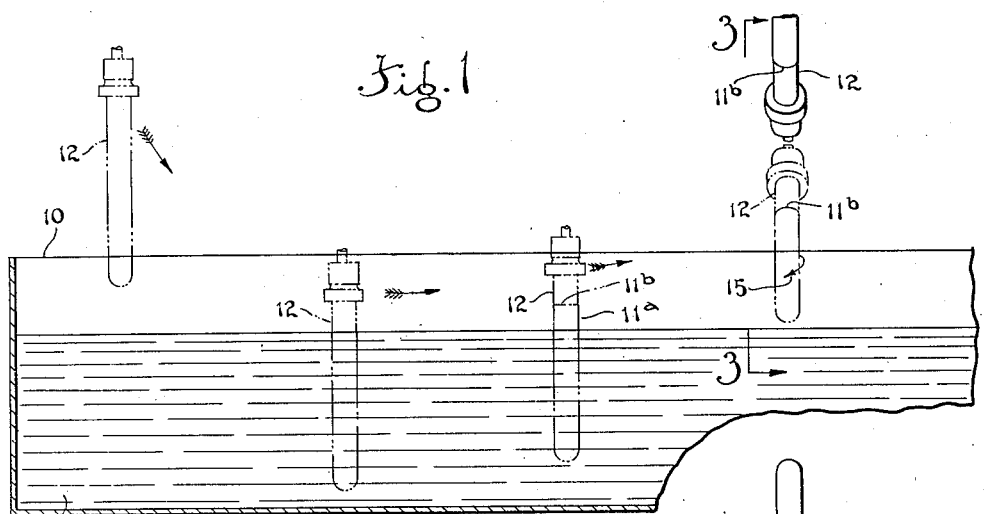
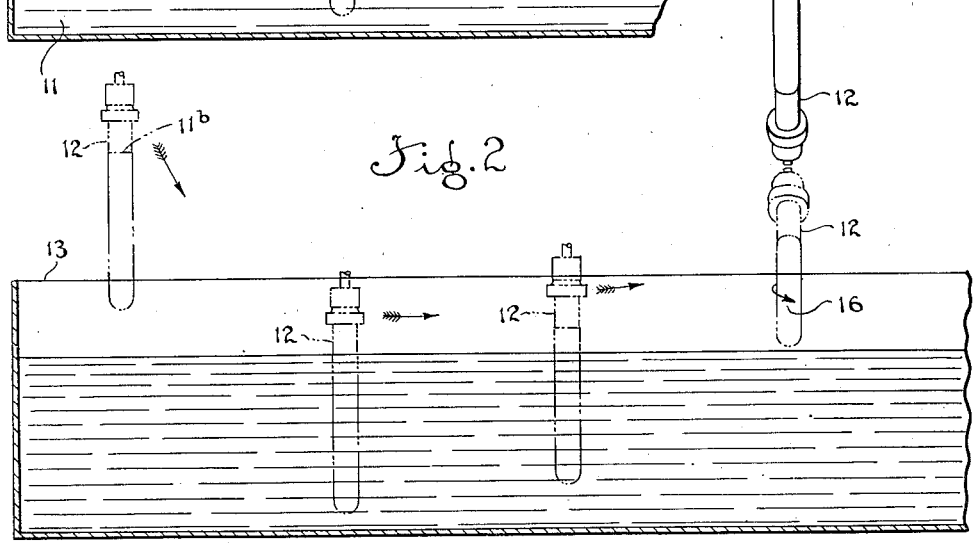
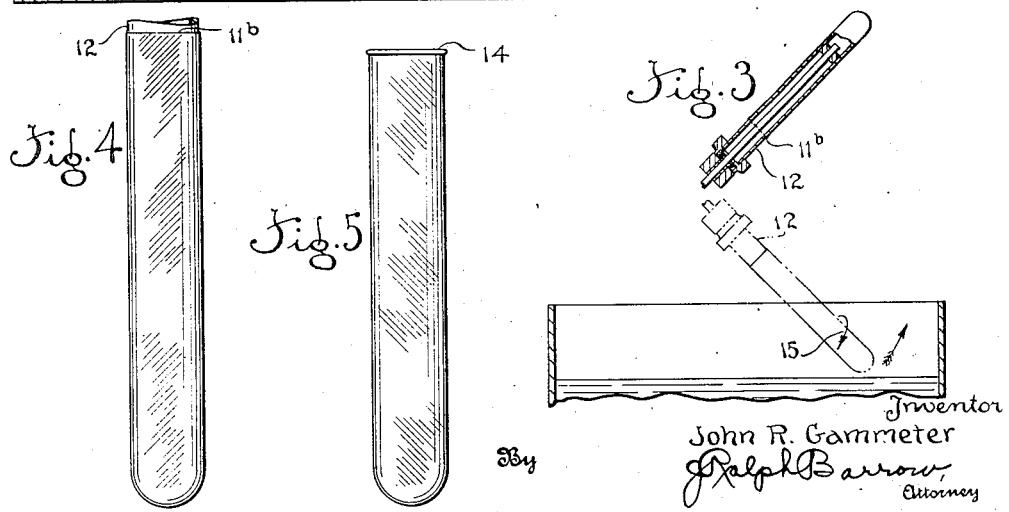
Inventor
John R. Gammeter
By Ralph Barrow,
Attorney Patented Dec. 6, 1938

2,139,545

UNITED STATES PATENT OFFICE 2,139,545

DIPPED RUBBER ARTICLE AND METHOD FOR MAKING THE SAME

John R. Gammeter, Akron, Ohio

Application May 11, 1937, Serial No. 141,977

4 Claims. (Cl. 18—58)

This invention relates to methods for making dipped rubber articles, such as prophylactic rubber articles, finger cots, toy balloons, and the like, and procedure for making the same.

Heretofore, dipped goods have been made by using a form which is passed through a body of liquid latex containing vulcanizing ingredients and rotated as it passes through the body of latex and rotated as it passes out of the body of latex and oscillated between positions above and below the horizontal while rotating until the latex is set upon the form.

Rubber latex has a grain or fibre and this grain or fibre tends to align with the direction of rotation of the form, so as to extend more or less helically around the form in one direction, that is in the direction of rotation of the form. As heretofore made, these goods have been produced by a two dip process in which the forms are rotated as described during and after each dip, the forms being rotated in the same direction, so that the fibre or grain in each layer of the goods extends helically in the same direction. These goods are objectionable in that there is a tendency for them to twist in the direction of the grain or fibre of the rubber therein and they are not so strong lengthwise as goods that have been produced by other processes.

One purpose of the present invention is to provide goods made in such a way that the fibre or grain of the rubber of one layer made by the first dip extends helically in one direction and the fibre or grain in the rubber of the other layer made by the second dip extends helically in an opposite direction to provide goods in which the tendency for twisting is eliminated and which the tensile strength of the goods lengthwise thereof is greatly increased. These may be made by the method heretofore employed by merely reversing rotation of the forms during or after alternate dips.

Another purpose of the invention is to provide an improved method for making dipped rubber goods with or without the reversed helical grain or fibre in alternate layers.

The foregoing and other purposes of the invention are attained in the dipped goods by the methods illustrated in the accompanying drawing and described below.

It is to be understood that the invention is not limited to the specific form thereof shown and described.

Of the accompanying drawing:

Figure 1 is a diagrammatic view showing one manner of dipping goods in accordance with this invention.

Figure 2 is a similar view showing the manner of carrying out the second dip of the goods in accordance with this invention.

Figure 3 is a section on line 3—3 of Figure 1, partly broken away.

Figure 4 is an elevation showing the rubber deposited upon the form after the first dip with shading indicated in the direction of the grain or fibre which, of course, is not visible.

Figure 5 is an elevation showing the finished article embodying the invention, with shading indicated in the direction of the grain or fibre in the second dip.

Referring to the drawing, the numeral 10 designates a tank, containing a body of latex 11, in which forms 12, 12 may be dipped to carry out the invention. The numeral 13 designates a tank similar to tank 10, containing a body of latex 11 in which the forms may be dipped as shown in Figure 2 for the second dip of the improved method.

Carrying out the method in its preferred form, forms are lowered into the tank so as to dip into the latex with the forms in a substantially vertical position, so that they are immersed in the latex the desired depth. During this operation the forms are preferably not rotated. The forms are then partially withdrawn from the latex as indicated at 11$^a$ so that an even edge of deposited rubber is provided as at 11$^b$. The forms may then be swung upwardly out of the latex, as is best shown in Figure 3, and just after they pass out of the body of the latex the forms are rotated in one direction as indicated by the arrow at 15. This causes the forms to leave the latex at an acute angle so that the latex which otherwise would drip from the form is picked up by the rotation and distributed on the form. The forms are oscillated between positions above and below the horizontal while this rotation is continued until the latex is dried or set upon the form. This provides the first dipping. Thereafter, the forms are introduced into the latex, as in Figure 2, in a manner similar to Figure 1 and partly removed therefrom in the same way as described with reference to Figures 1 and 3 and swung out of the latex and rotated in the reverse direction as indicated by the arrow at 16 and oscillated between positions above and below the horizontal until the latex of the second coat is dried on the form, the rotation of the form being continued while the form is oscillated above and below the horizontal.

As will be apparent this method provides a deposit of rubber upon the form in which there is one layer with a helical arrangement of fibre or grain in one direction and another layer with a helical arrangement of fibre or grain in the opposite direction. These dippings may be repeated as necessary to produce goods of the desired thickness.

After the second dip the forms are passed through a ring rolling device and a ring or bead 14 is rolled on the deposited rubber to produce the finished article, as shown in Figure 5, which has been vulcanized and subsequently stripped from the form.

A suitable apparatus may be utilized to carry out the methods disclosed in Figures 1, 2, and 3, this apparatus being disclosed in co-pending application, Serial No. 151,193, filed June 30, 1937. In the resulting article there is no tendency for the article to twist in the direction of the helical grain or fibre of the rubber, since this tendency in one layer to twist in one direction is opposed by an equal tendency in the other layer of rubber to twist in the other direction. The reversed helical grain formation of the two layers of goods substantially increases the strength of the goods lengthwise.

It will be understood, of course, that the invention can be carried out in three or more dips, revolving the forms to distribute the latex thereon in opposite directions for alternate layers while oscillating the forms above and below the horizontal.

Modifications of the invention may be resorted to without departing from the spirit thereof or the scope of the appended claims.

What is claimed is:

1. Dipped rubber articles comprising a plurality of layers of rubber deposited from liquid latex with a grain or fibre in alternate layers extending helically about the article in opposite directions.

2. Dipped rubber articles comprising two layers of deposited rubber with a grain or fibre therein extending helically about the form in opposite directions.

3. That process for making dipped rubber articles which comprises depositing a layer of rubber upon a form and rotating the form in one direction while oscillating it above and below the horizontal to distribute the rubber thereon, with the grain of rubber extending helically in one direction about the form, depositing another layer of rubber on the form and rotating the form in the opposite direction while oscillating it above and below the horizontal to form a second layer of rubber with the grain thereof extending helically in the opposite direction.

4. That method for making dipped goods, comprising inserting a form in a substantially vertical position into a tank containing liquid latex and immersing the form to a predetermined depth therein, thereafter raising the form substantially in a vertical direction from the latex, so as to leave a deposit with an even upward edge on the form, thereafter swinging the form out of the latex to remove the form therefrom at an acute angle to the surface of the latex and rotating the form while oscillating it above and below the horizontal until the deposit is set thereon, repeating the process as described to deposit another layer of rubber on the form and thereafter rotating the form in an opposite direction while oscillating it above and below the horizontal until the deposit of the second layer has set on the form.

JOHN R. GAMMETER.